3,516,925
CATALYTIC CONVERSION OF HYDROCARBONS
Paul Anthony Lawrence, Stanwell, Robert William Aitken, Camberley, and Robert Neil Bennett, Ashford, England, assignors to The British Petroleum Company Limited, London, England, a company of England
Filed Feb. 25, 1965, Ser. No. 435,245
Claims priority, application Great Britain, Mar. 10, 1964, 10,028/64
Int. Cl. C10g *13/02*
U.S. Cl. 208—111                 2 Claims This invention relates to the hydrocatalytic conversion of hydrocarbons, particularly petroleum hydrocarbons.

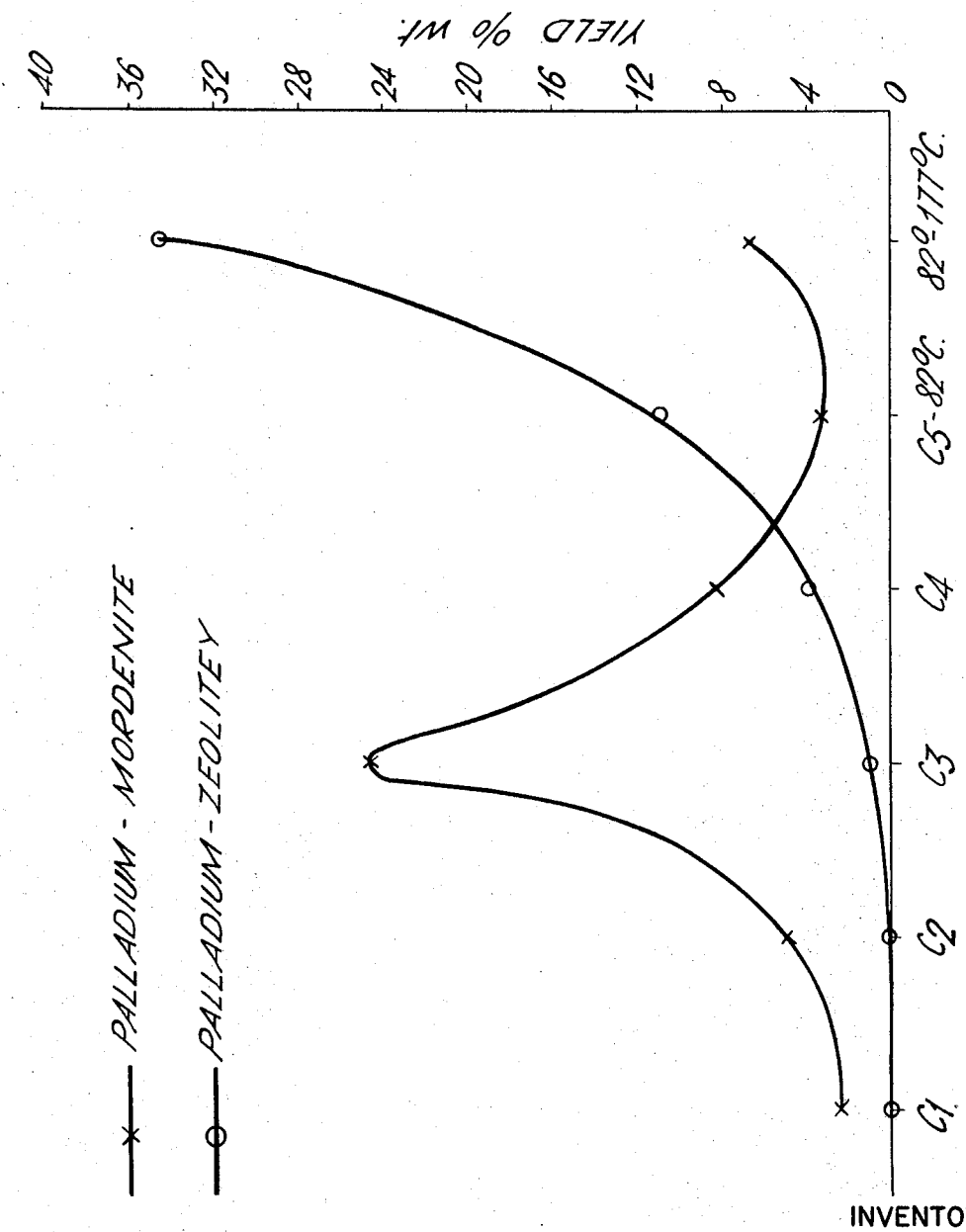

According to the present invention a process for the catalytic conversion of hydrocarbons comprises contacting the hydrocarbons at elevated temperature and pressure and in the presence of hydrogen with a catalyst comprising a crystalline mordenite having pore openings at least 5 A. in diameter, and a hydrogenating component selected from metals, or oxides thereof, of Group VI or VIII of the Periodic Table.

Zeolites are a well known class of alumine-silicate minerals having a molecular structure composed of a rigid network of aluminium, silicon and oxygen atoms together with interchangeable ions which may be for example metal cations, hydrogen or ammonium ions. They are also characterised by having pore openings which are uniform in size in any give n zeolite, but which may vary in different zeolites over a range of 3 to 15 A. The principal uses for which they have been proposed are base exchange and selective adsorption, but certain of them have also been proposed as catalysts for certain uses.

Zeolites may be classified into types according to their X-ray powder diffraction patterns. Mordenite is one such type of zeolite, and it has been shown by X-ray diffraction studies that dehydrated mordenite contains main pores which are non-intersecting and which, ignoring the presence of cations, have a cross-section 7.1 A. by 5.9 A. It has also been shown that the main pores have side pockets of minimum diameter 3.9 A. The cations are located in the main pores of the mordenite; in the sodium form of mordenite the sodium cations appear to block the main pores to such an extent that access is substantially denied to n-butane which has an effective diameter of about 5 A., i.e., the effective pore diameter is reduced to below 5 A.

The sodium cations can be exchanged, using conventional base exchange techniques, for other metallic cations. The metal cations can also be replaced by hydrogen ions and in this form the mordenite is in what is now commonly known as the "decationised" form. The decationisation treatment is normally carried out in one of two ways. According to the first method a metal cation form of mordenite, such as the sodium form, is base exchanged with ammonium cations. The ammonium form is then heated to drive off ammonia, leaving behind the hydrogen form or decationised mordenite. According to the second method the mordenite may be treated with a mineral acid, for example hydrochloric or sulphuric acid, in order directly to decationise the mordenite. In at least the decationised mordenite prepared by the direct acid treatment, in addition to the replacement of metal cations by hydrogen, it appears that one atom of aluminium per unit cell is removed from the mordenite lattice and is replaced by four hydroxyl groups. The mordenite which has been decationised by direct acid treatment is capable of sorbing neo-pentane which has an effective diameter of about 8 A., i.e., the maximum cross-sectional dimension of the main pores must have been increased to at least this figure, presumably as a result of the replacement of the aluminium atom by the hydroxyl groups.

Mordenite has been found to be a particularly suitable material for use in catalyst compositions to be used in a variety of hydrocatalytic conversion processes. The mordenite used is preferably synthetic and should have a pore size at least 5 A. in diameter and preferably 7–9 A.

One example of a suitable synthetic mordenite is that manufactured and marketed by the Norton Company. The mordenite may be in a base-exchange form in which the normal sodium ions have been replaced with other metal cations. The mordenite is preferably, however, in the decationised form described above. Preferably the metal cation content is reduced to an amount not exceeding 2% wt., more particularly not exceeding 0.5% wt., of the mordenite.

The particular process desired and the feedstock to be treated will determine the precise nature of the mordenite preferred, also the particular hydrogenating component incorporated therewith, and also the optimum process conditions of temperature, pressure, space velocity, hydrogen flow rate and the like. Examples of hydrocatalytic processes which can be suitable catalysed by the mordenite-based catalyst herein described include hydrocracking, hydroisomerisation, dehydrogenation—since the hydrogenating components can, under appropriate process conditions, also act as dehydrogenating components, and disproportionation—i.e. the conversion of a feed hydrocarbon to a mixture of hydrocarbons having higher and lower carbon numbers than the feed hydrocarbon.

Hydrocracking is a well known process for the hydrocatalytic conversion of high boiling hydrocarbons to produce lower boiling materials and/or materials of lower pour point than the feedstock. For hydrocracking the hydrogenating component is preferably a platinum group metal, particularly platinum or palladium, and it is preferably added by ion-exchange. Where a decationised mordenite prepared by the ammonia route is employed, the metal is preferably added after the ammonium exchange but before the heat treatment to drive off the ammonia. Preferably, however, a mordenite decationised by acid treatment is employed. The amount of the platinum group metal is preferably within the range 0.01 to 10% wt. particularly 0.1 to 5% wt. However, iron group metals, particularly nickel, also give useful results and they may be used in amounts similar to the platinum group metals. Mixtures of certain Group VI and VIII metals and compounds may also be used, e.g. cobalt and molybdenum.

Zeolite crystals, including mordenite, normally contain water molecules which may be eliminated by heating without destroying the crystal structure. The hydrocracking temperatures used are such that substantially all the water present would be eliminated and the mordenite is, therefore, preferably initially in a substantially anhydrous form to avoid the production of water or steam during processing.

The hydrocarbon feedstocks may be of any suitable carbon number and boiling range. Thus with petroleum hydrocarbons the feedstocks may be normally gaseous hydrocarbons, or gasoline or kerosine boiling range materials. Higher boiling range materals may also be treated and, in fact, preferred feedstocks to the hydrocracking process are petroleum fractions containing more than 50% vol. of material boiling above 250° C., more particularly fractions with more than 50% vol. boiling within the range 370–600° C.

A particular feature of the catalysts employed in the present invention, is their selectivity for cracking waxy hydrocarbons. This selectivity renders the catalysts especially useful for use in hydrocracking operations wherein the principal object is to produce materials boiling substantially within the same range as the feedstock but having a lower pour point than the feedstock, as the waxy hydrocarbons are the components which largely contribute to high feedstock pour points. Thus a particularly suitable feedstock for hydrocracking according to the invention is a so-called wax distillate fraction. However, although wax distillates are particularly preferred feedstocks, the process is also applicable to lower boiling fractions, for example gas oils (i.e. fractions with at least 60% wt. boiling within the range 250–370° C.). The feedstocks may be either derived directly from a crude oil or they may be products from a thermal or catalytic cracking step. They may also be pretreated as necessary for the removal of non-hydrocarbon impurities, for example, sulphur, nitrogen or oxygen.

In addition to their usefulness in catalysing specific pour point reduction treatments, the catalysts may also be used, in view of their selectivity for wax cracking, to catalyse treatments designed to dewax certain feedstocks, for example lubricating oil fractions, if desired.

Suitable hydrocracking process conditions include a temperature within the range 450–950° F., a pressure within the range 250–3000 p.s.i.g., preferably 1000–2500 p.s.i.g., a space velocity between 0.2–20.0 v./v./hr., preferably 0.4–5.0 v./v./hr., and a gas rate of 1000–20,000 s.c.f./b., preferably 5000–15,000 s.c.f./b.

The total weight of hydrocracked products boiling below the initial boiling point of the feedstock will be hereinafter referred to as the conversion, and the extent of conversion may be controlled according to known principles by altering the process conditions. Conversion will be increased for example, by increasing temperature and/or decreasing the space velocity.

The actual conditions chosen will depend upon the type of product required. For example, if low-boiling products are required primarily, the conditions chosen will be relatively severe within the broad range disclosed above. If, however, products of reduced pour point are required, the conditions employed will be milder. By choosing conditions intermediate the extremes of the broad range quoted above the relative proportions of lower-boiling product and low your point residue can be varied at will.

The hydrocracking aspect of the invention is illustrated by the following Examples 1–10.

EXAMPLE 1

The sodium form of a synthetic mordenite was ammonium exchanged in the following manner: 450 g. of an 18% solution of ammonium chloride was refluxed with 100 g. of the sodium form of mordenite for four hours. The mix was filtered and the mordenite was thoroughly washed. The refluxing and filtration procedure was carried out three times in all, using fresh ammonium chloride solution each time. After the final filtration the mordenite was reslurried twice with distilled water and then filtered. The final filtrate was chloride free. Finally the ammonium exchanged mordenite was dried for 16 hours at 120° C.

was complete, stirring was continued for 16 hours. The slurry was then filtered and the mordenite was washed. The filtrate was reslurried with distilled water and filtered again. The filtrate was chloride free. The mordenite crystals were dried, pelleted and broken into 8–16 mesh particles for testing.

The removal of the ammonium from the finished catalyst was then carried out by heating the catalyst slowly. The palladium mordenite was dried at 120° C. for 16 hours. Its temperature was raised to 200° C. and the heating was continued for 6 hours. The temperature was then raised slowly (over 3 hours) to 500° C. After 3 hours at this temperature the catalyst was removed and allowed to cool in a dry atmosphere.

The catalyst prepared as described above was used to hydrocrack a wax distillate which had been pretreated to reduce the nitrogen content to 40 to 50 p.p.m.

The process conditions used were:

| | |
|---|---:|
| Temperature, ° F. | 500–700 |
| Pressure p.s.i.g. | 1000 |
| Space velocity v./v./hr. | 1.0 |
| Once through gas rate s.c.f. of $H_2$/B | 10,000 |

Inspection data on the feed and on the products obtained at different temperatures are shown in Table 1.

TABLE 1

| | Feed | Temperature | | | | |
|---|---|---|---|---|---|---|
| | | 500 | 550 | 600 | 650 | 700 |
| $C_1$ | | | 0.14 | 0.44 | 1.35 | 2.36 |
| $C_2$ | | | | 0.56 | 2.29 | 4.90 |
| $C_3$ | | 0.37 | 2.11 | 7.10 | 14.83 | 24.58 |
| $iC_4$ | | | 0.59 | 0.65 | 1.42 | 2.95 |
| $nC_4$ | | | 1.30 | 4.15 | 4.68 | 5.33 |
| $C_5$–82 | | 0.20 | 1.57 | 2.00 | 2.41 | 3.33 |
| 82–177 | 6.4 | 5.48 | 4.45 | 5.53 | 6.19 | 6.73 |
| 177–371 | 37.6 | 37.39 | 34.90 | 34.08 | 29.75 | 23.40 |
| >371 | 56.0 | 56.56 | 53.93 | 45.49 | 37.09 | 26.43 |
| Conversion <177° C. | | Nil | 5.1 | 15.0 | 28.6 | 46.8 |

The yield of products up to 177° C. obtained at 700° F. are shown in graphical form in the accompanying drawing. The figure of the drawing also shows yields obtained with a similar feedstock and process conditions but using a palladium-zeolite catalyst in which the zeolite was Zeolite Y and not mordenite. The marked difference in the distribution of hydrocarbons in the products is immediately apparent. Under the process conditions used, the mordenite catalyst gives a high yield of $C_3$ hydrocarbons, while the Zeolite Y catalysts gives predominantly hydrocarbons in the 82 to 177° C. boiling range.

In the following Table 2 annalytical data are given on the gas oils (177°–371° C.) and residue (>371° C.) obtained from the feedstock and from products obtained at 600° F. with the palladium-mordenite catalyst and the palladium-Y-type zeolite catalyst at the same conversion level.

TABLE 2

| | Gas oil 177°–371° C. | | | Residue 371° C. | | |
|---|---|---|---|---|---|---|
| Inspection date | Feed | Pd on mordenite | Pd on Y-type zeolite | Feed | Pd on mordenite | Pd on Y-type zeolite |
| Specific gravity | [1] 0.8711 | [1] 0.8795 | [1] 0.8418 | [2] 0.8430 | [1] 0.8534 | [2] 0.8290 |
| Wax content, percent wt | 3.0 | Trace | 2.7 | 17.8 | 4.2 | 19.7 |
| Pour point, ° F | −10 | <−70 | 0 | 100 | 55 | 105 |
| Cloud point, ° F | +18 | <−70 | 12 | 99 | 62 | 102 |
| Diesel index | 41 | 37 | 61/62 | | | |
| Yield on total product, percent wt | 37.6 | 34.1 | 42.9 | 56.0 | 45.5 | 45.8 |

[1] SG at 60° F./60° F.   [2] SG at 140° F./60° F.

The sodium content of the exchange mordenite was 0.1% wt. The ammonium content was 4.9% wt.

Palladium was exchanged on to the ammonium mordenite prepared above using an ammine complex in which the metal was in the cationic part of the complex.

100 g. of ammonium exchanged mordenite were slurried with 150 ml. of distilled water. 1.2 g. of tetrammine palladous chloride dissolved in 150 ml. of distilled water was then added slowly to the stirred mordenite slurry. The addition took six hours. When the addition It is seen that the gas oil and residue products obtained with the Pd-Y-type zeolite are of similar wax content and pour and cloud point as the feedstock fractions, but the gravities are lower and the diesel index of the gas oil is higher, indicating a considerable degree of hydrogenation of aromatics With the Pd-mordenite catalyst the specific gravities of both the gas oil and residue fractions are higher than the feedstock, which suggests that little hydrogenation has occurred. There is, however, a considerable reduction in wax content of both gas-oil and residue which is believed to be the cause of the reduction in cloud point and pour point. It is believed that the Pd-mordenite catalyst has a very high selectively for wax conversion by hydrocracking to components boiling below 177° C.

EXAMPLE 2

A catalyst comprising 0.42% weight of platinum on decationised mordenite prepared by direct acid treatment in a manner similar to the the catalyst of Example 1 was used to treat a desulphurised/denitrogenated Agha Jari gas oil of boiling range 190–360° C.

The full catalyst analysis is given in Table 3 below:

TABLE 3

Loss at 1020° F.—12.0% wt.
Stable at 1020° F. basis:
    Platinum—0.42% wt.
    Aluminum—5.5% wt.
    Silican—42.0% wt.
    Sodium—0.29% wt.
    Ammonium—2.75% wt.
    Iron—0.10% wt.
    Chlorine—0.01% wt.
    Surface area—m.$^2$/g.—4.02% wt.
    Pore volume—m.1/g.—0.20% wt.

The process conditions employed were 750° F., 1000 p.s.i.g., 2 v./v. hr., and 10,000 s.c.f./b. hydrogen (once through). Feed and product data are indicated in Table 4 below:

TABLE 4

| | Feed | Product |
|---|---|---|
| Product yield (stabilised to 150° C.), percent wt | | 84.7 |
| Specific gravity at 60° F./60° F | 0.8363 | 0.8365 |
| Cloud point, ° F | 30 | 12 |
| Pour point, ° F | 20 | 5 |
| Sulphur, percent w | 0.11 | 0.06 |

The cloud point and pour point were reduced by 18° F. and 15° F. respectively. Above 750° F. it was found that the reaction tended to run away with complete degradation of feedstock.

EXAMPLE 3

The catalyst of Example 2 was employed to treat a raw Libyan wax distillate, 10% of which boiled within the range 232–371° C. and the remainder above 371° C., under the same process conditions as those employed in Example 2.

Product data are given in Tables 5 and 6 below:

TABLE 5.—PRODUCT DISTRIBUTION PERCENT WT.

| | |
|---|---|
| Methane | 0.5 |
| Ethane | 0.6 |
| Propane | 9.8 |
| Isobutane | 3.4 |
| n-Butane | 4.3 |
| Isopentane | 1.1 |
| n-Petane | 4.8 |
| Isohexanes | 0.6 |
| n-Hexane | 1.6 |
| 82–177° C. | 0.4 |
| 177–232° C. | 0.2 |
| 232–350° C. | 2.7 |
| 350–371° C. | 7.7 |
| Residue >371° C. | 62.3 |

TABLE 6

| | Feedstock | Product heavy gas oil 350°–371° C. | Product residue >371° C. |
|---|---|---|---|
| Specific gravity, 140° F./60° F | 0.8442 | [1] 0.8775 | 0.8731 |
| Cloud point, ° F | 120 | 14 | 60 |
| Pour point, ° F | 105 | −25 | 55 |
| Sulphur, percent wt | 0.22 | 0.23 | 0.24 |
| Nitrogen, p.p.m | 630 | | |
| Diesel index | | 53 | |
| Wax, percent wt | 32.3 | 1.8 | 11.0 |
| Melting point of wax, ° F | 129 | 100 | 105 |

[1] Specific gravity at 60° F./60° F.

The yield of kerosine and naphtha is very low. The amount of gas oil (232–371° C.) in the product is substantially the same as in the feedstock, but has very different properties. The pour point of the 350–371° C. fraction is very low and the gravity high.

These results points to a high selectivity towards the cracking of paraffinic wax. No loss of catalyst activity was observed.

EXAMPLE 4

The catalyst of Example 2 was employed to treat (i) a raw Agha Jari wax distillate and (ii) a Libyan atmospheric residue. Feed, operating conditions and product inspection data in each case are given in Table 7 below:

TABLE 7

| | Feedstock | | | |
|---|---|---|---|---|
| | Raw Agha Jari wax distillate | | Libyan atmos- residue | |
| | Feed | Product | Feed | Product |
| Operating conditions: | | | | |
|   Pressure, p.s.i.g | 1,000 | | 1,000 | |
|   Temperature, ° F | 765 | | 775 | |
|   Space velocity, V./V./hr | 2 | | 1 | |
|   Liquid yield, percent wt | 81.3 | | 81.9 | |
|   Gas Rate (once through), s.c.f./b | 10,000 | | 10,000 | |
| Inspection data: | | | | |
|   Specific gravity, 140° F./60° F | 0.8953 | 0.8710 | 0.8848 | 0.8990 |
|   Sulphur, percent wt | 1.82 | 1.87 | 0.23 | 0.23 |
|   Cloud point, ° F | 70 | | | |
|   Pour point, ° F | 105 | 45 | 115 | 80 |
| Yield of material, >371° C., percent wt | 95.9 | 84.9 | | |
| Pour point of material, >371° C., ° F | 105 | 65 | | |

EXAMPLE 5

The catalyst of Example 2 was employed to treat a raw Kuwait wax distillate. Feed, operating conditions and product inspection data are given in Table 8 below:

TABLE 8

| | | Feed | Product |
|---|---|---|---|
| Operating conditions: | | | |
|   Pressure, 1,000 p.s.i.g | Yield of liquid product, percent wt | | 9°.8 |
|   Temperature, 750° F | Specific gravity, 140° F./60° F | 0.8986 | 0.8824 |
|   Space velocity, 2.0 v./v./hr | Sulphur, percent wt | 2.92 | 2.76 |
|   Hydrogen rate 10,000 s.c.f./b | Pour point, ° F | 85 | 25 |
| | Material >371° C.: | | |
| |   Yield on feed, percent wt | 98 | 71.4 |
| |   Pour point, ° F | 85 | 55 |

EXAMPLE 6

A Pt-mordenite catalyst prepared as in Example 2 was used to treat a Raw Nigerian Gas Oil, boiling range 230–420° C. Processing conditions and product inspection data are given in Table 9 below:

TABLE 9

| | Feed | Product |
|---|---|---|
| Pressure, p.s.i.g | 1,000 | 1,000 |
| Temperature, ° F | 700 | 700 |
| L.H.S.V. v./v./hr | 210 | 210 |
| Gas rate (once thro' H$_2$) s.c.f./b | 10,000 | 10,000 |
| Liquid yield, percent wt | | 86.5 |
| Sulphur content, percent wt | 0.10 | |
| Pour point, ° F | 80 | −25 |

EXAMPLE 7

A Co Mo mordenite catalyst was made by mixing 100 ml. of decationised mordenite with a solution containing 10.5 g. of cobalt nitrate dissolved in 60 ml. of water. The mix was allowed to stand for three hours and was then filtered, dried at 120° C. and calcined at 550° C. for two hours. The mordenite was then mixed with 13.5 g. of ammonium molybdate dissolved in 60 ml. of water. The mix was allowed to stand for three hours and the excess liquid was filtered off. The catalyst was then dried, pressed into ³⁄₁₆ inch pellets and granulated 8–16 mesh. Finally the catalyst was calcined for two hours at 550° C.

This catalyst was used in an atmospheric pilot plant hydrocracking test with a n-heptane feedstock, and a hydrogen to hydrocarbon mole ratio of 7.4 to 1. The space velocity used was 480 volumes of gas/volume of catalyst/hour.

A gas chromatographic analysis of the product is given in Table 10 below. It can be seen that the product distribution is similar to that obtained with a Pt on decationised mordenite catalyst.

TABLE 10

| Percent mole | Co Mo on hydrogen mordenite at 350° C. | PT on hydrogen mordenite at 210° C. |
|---|---|---|
| n-Heptane | 0.536 | 0.338 |
| 3 methylhexane | 0.034 | 0.085 |
| 2 methylhexane | 0.028 | 0.074 |
| Dimethylpentane | | 0.008 |
| n-Pentane | 0.007 | 0.016 |
| Isopentane | 0.007 | 0.024 |
| n-Butane | 0.038 | 0.020 |
| Isobutane | 0.113 | 0.185 |
| Propane | 0.193 | 0.206 |
| Methane and ethane | 0.044 | 0.018 |

A high yield of propane, and also isobutane, is obtained in each case.

EXAMPLE 8

(i) A nickel on decationises mordenite catalyst was prepared by impregnating hydrogen mordenite with a nickel hexammine formate solution. The following procedure was used 30 g. of nickel formate was dissolved in a mixture of 97 ml. of 0.88 ammonia solution and 97 ml. of water. This solution was added to 200 g. of hydrogen mordenite and the slurry was allowed to stand for two hours. The excess liquid was filtered off and the mordenite was dried, pelleted to ³⁄₁₆ inch by ³⁄₁₆ inches and then granulated 8 to 16 mesh. The catalyst was calcined for two hours at 250° C. before use.

(ii) A tungsten on decationised mordenite catalyst was prepared by impregnating hydrogen mordenite with ammonium metatungstate in the following manner. 15 g. of ammonium metatungstate was dissolved in 195 ml. of water. This solution was added to 200 g. of hydrogen mordenite and the slurry was allowed to stand for two hours. The excess liquid was filtered off and the mordenite was dried and then pelleted and finally granulated 8 to 16 mesh.

These catalysts were tested in an atmospheric pilot plant hydrocracking test with a n-heptane feedstock and a hydrogen to hydrocarbon mole ratio of 7.4 to 1. The space velocity used was 450 volumes of gas/volume of catalyst/hr. A gas chromatographic analysis of the product is given in Table II below.

TABLE 11

| | Nickel on hydrogen mordenite, 220° C. | Tungsten on hydrogen mordenite |
|---|---|---|
| n-Heptane, mole fr | 0.622 | 0.396 |
| 3-methylhexane | | Tr |
| 2-methylhexane | | Tr |
| Dimethylpentane | | |
| n-Pentane | 0.013 | 0.029 |
| Isopentane | 0.017 | 0.023 |
| n-Butane | 0.035 | 0.085 |
| Isobutane | 0.095 | 0.156 |
| Propane | 0.176 | 0.274 |
| Methane and ethane | 0.042 | 0.038 |

EXAMPLE 9

A characteristic of the Co Mo-mordenite catalyst prepared as described in Example 7 is its ability to improve the colour of waxy distillates. A run was carried out under the following conditions.

Pressure—1000 p.s.i.g.
Catalyst temperature—750° F.
Liquid space velocity—2.0 v./v./hr.
Gas recycle rate—10,000 s.c.f./bz.

The colour of the Libyan waxy distillate feed to the pilot plant was greater than 8.0 on the ASTM scale. The colour of the product was 4.6 on the ASTM scale.

EXAMPLE 10

The nickel on decationised mordenite catalyst of Example 8 was used to treat a Libyan waxy distillate boiling within the range 340–600° C. under the conditions employed in Example 10.

The ASTM colour of the waxy distillate was reduced from over 10 to 6.1.

For hydroisomerisation reactions the hydrogenating component incorporated with the mordenite is preferably selected from metals and their oxides of Group VIII of the Periodic Table, particularly platinum and palladium.

Suitable general conditions for hydroisomerisation include a temperature between 350 and 700° F., a pressure between 0 and 1000 p.s.i.g., a space velocity between 0.2 and 10.0 v./v./hr., and a hydrogen:hydrocarbon mole ratio of from 0.25:1 to 15:1.

Suitable feedstocks include straight-chain hydrocarbons, especially those boiling in the gasoline range, and also alkyl aromatics.

The hydroisomerising activity of the catalysts according to the present invention is illustrated with reference to the following Examples 11–13.

EXAMPLE 11

The platinum-decationised mordenite of Example 2, was examined for n-pentane isomerisation under the following conditions:

Temperature—270–525° F.
Pressure—250 p.s.i.g.
Space Velocity—2 v./v./hr.
Hydrogen:Hydrocarbon mol ratio—2.5:1
Feedstock—94% n-pentane; 6% iso-pentane No activity was obtained below 400° F. but at 500° F. the product contained 40% wt. isopentane, and at 525° F. 60% wt. isopentane, i.e. a very close approach to thermodynamic equilibrium.

EXAMPLE 12

A 40% $C_5$/60% $C_6$ straight run gasoline fraction was hydroisomerised using the catalyst of Example 2 and under the following conditions:

Temperature—500, 525, 550° F.
Pressure—250 p.s.i.g.
Space Velocity—1 vol./vol./hr.
$H_2$/HC—2.5:1 mol ratio The $C_5$/$C_6$ conversions [1] obtained at the various temperatures were

| | Temperature | | |
|---|---|---|---|
| Conversion [1] | 500° F. | 525° F. | 550° F. |
| $C^5$ | 56 | 60 | 67 |
| $C^6$ | 11 | 13 | 16 |

[1] $C_5$ conversion $= \frac{iC_5}{iC_5 + nC_5} \times 100\%$ wt.

$C_6$ conversion $= \frac{2,2 \text{ dimethylbutane}}{\text{Total } C^6 \text{ paraffin}} \times 100\%$ wt.

EXAMPLE 13

Mordenite is a suitable base for catalysts which are used for the isomerisation of alkyl aromatics. An example of this is the isomerisation of a methylene phthaline. The table given below contains the analysis of the product obtained where α-methyl naphthalene is passed over the catalyst of Example 2. It can be seen that at 750° F. and 3000 p.s.i.g., 21.90 of the β isomer is formed. The product also contains a high proportion of tetratins and decatins in addition to breakdown products. When the pressure is dropped to 1000 p.s.i.g., the proportion of the β isomer is increased and the proportion of hydrogenated naphthenes and breakdown products are decreased. Raising the catalyst temperature to 550° F. further raises the proportion of β methylnaphthalene in the product and only slightly increases the component of hydrogenated aromatics and breakdown products.

TABLE 12

| Operating conditions: | | | |
|---|---|---|---|
| Temperature, °F | 750 | 750 | 850 |
| Pressure, p.s.i.g | 3,000 | 1,000 | 1,000 |
| Liquid hourly space velocity, v./v./hr. | 1.2 | 1.2 | 1.2 |
| Gas rate, s.c.f./b | 10,000 | 10,000 | 10,0000 |
| Product analysis, percent wt.: | | | |
| α Methyl naphthalene | 23.5 | 59.5 | 31.5 |
| β Methyl naphthalene | 21.5 | 35.0 | 59.5 |
| Indane based compound | 2.5 | | 0.5 |
| 5 methyl tetraline | 10.5 | 1.0 | 1.0 |
| 6 methyl tetraline | 13.5 | 1.0 | 2.0 |
| 1 methyl tetraline | 10.0 | 1.0 | 1.5 |
| 2 methyl tetraline | 6.5 | | |
| Mixture containing for example C¹¹ alkyl benzenes | 7.0 | 0.5 | 1.0 |
| α, β Methyl decalins | 4.0 | 2.0 | 1.0 |
| Mixture containing toluene and benzenes, etc | 1.0 | | 2.0 |

Hydrocarbon disproportionation may also be attained in accordance with the present invention, the hydrogenating component preferably being platinum or palladium. Suitable process conditions include temperatures between 600°–1100° F., pressure from 0 to 1500 p.s.i.g. space velocities from 0.1 to 20 v./v./hr. and hydrogen to hydrocarbon mole ratios of 0.25:1 to 15:1. Disproportionation is illustrated with reference to Example 14 below:

EXAMPLE 14

The platinum-decationised mordenite catalyst of Example 2 was used to catalyse the disproportionation of toluene to benzene and xylenes. Three runs were carried out at 750° F., 850° F. and 950° F., respectively, 200 p.s.i.g., 1.0 v./v./hr., and a hydrogen:hydrocarbon mol ratio of 8:1. Results are indicated in Table 13 below.

TABLE 13

| Product composition percent mol | 750° F. | 850° F. | 950° F. |
|---|---|---|---|
| Benzene | 22.1 | 21.7 | 11.6 |
| Toluene | 44.6 | 45.6 | 43.1 |
| m- and p-Xylene | 19.4 | 19.5 | 26.4 |
| o-Xylene | 6.6 | 6.6 | 9.4 |
| Trimethylbenzenes | 5.9 | 5.9 | 9.5 |

For hydrogenation reactions the hydrogenating component is preferably a Group VIII metal or metal oxide, particularly platinum, palladium or nickel. Suitable ranges or process conditions are as follows:

Temperature—up to 750° F.
Pressure—0–3000 p.s.i.g.
Space Velocity—0.2–20 v./v./hr.
Hydrogen rate—250–20,000 s.c.f./b.

Hydrogenation is illustrated with reference to Example 15 below:

EXAMPLE 15

A feedstock containing 68.6% wt. aromatics in the $C_6$ to $C_9$ boiling range was contacted with the catalyst of Example 2. The operating conditions are given in the Table 14 along with an analysis of the aromatics in the feed and product.

TABLE 14

| Operating conditions: | |
|---|---|
| Catalyst temperature, °F | 390 |
| Pressure, p.s.i.g | 400 |
| Liquid hourly space velocity | 2.0 |
| Once through gas rate | 7,000 |

| Analysis | Feed | Product |
|---|---|---|
| Paraffins and cycloparaffins, percent wt | 31.4 | 94.0 |
| Aromatics (percent wt.): | | |
| Benzene | 7.2 | 0.3 |
| Toluene | 21.6 | 1.4 |
| Ethylbenzene | 4.6 | 0.1 |
| p-Xylene | 5.1 | 0.5 |
| m-Xylene | 12.0 | 1.5 |
| o-Xylene | 6.0 | 0.7 |
| $C_9$ aromatics | 11.7 | 1.5 |
| Higher aromatics | 0.4 | Trace |

We claim:

1. A process for the selective hydrocatalytic conversion of waxy petroleum feedstocks containing more than 50% volume of material boiling above 250° C., to produce materials boiling substantially within the same range as the feedstock but having a substantially lower pour point than the feedstock, comprising contacting the feedstock in the presence of hydrogen and at a temperature of 450–950° F., a pressure of 250–3,000 p.s.i.g., a space velocity of 0.2–20.0 v./v./hr., and a gas rate of 1,000–20,000 s.c.f./b., with a catalyst comprising a decationised crystalline mordenite having pore openings at least 5 A. in diameter, and a hydrogenating component selected from the group consisting of Group VI and VIII metals and oxides thereof, said decationised mordenite having been decationised by direct treatment with mineral acid to a metal cation content not exceeding 2% weight of the mordenite, and recovering, as a desired product, materials boiling substantially within the same range as the feedstock but having a substantially lower pour point than the feedstock.

2. A process for the selective conversion of wax-like hydrocarbons in waxy petroleum feedstocks which comprises contacting said feedstocks at a temperature of 450–950° F. and at elevated pressure in the presence of hydrogen with a decationised crystalline mordenite having pore openings at least 5 A. in diameter and a hydrogenating component selected from the group consisting of Group VI and VIII metals and oxides thereof, and recovering a product having a reduced wax content.

References Cited

UNITED STATES PATENTS

| | | | |
|---|---|---|---|
| 3,140,253 | 7/1964 | Plank et al. | 208—120 |
| 3,247,098 | 4/1966 | Kimberlin | 208—120 |
| 3,236,761 | 2/1966 | Rabo et al. | 208—120 |
| 3,242,068 | 3/1966 | Paterson | 208—111 |
| 3,259,564 | 7/1966 | Kimberlin. | |

DELBERT E. GANTZ, Primary Examiner

ABRAHAM RIMENS, Assistant Examiner

U.S. Cl. X.R.

208—120

PO-1050
(5/69)

UNITED STATES PATENT OFFICE
CERTIFICATE OF CORRECTION

Patent No. 3,516,925   Dated June 23, 1970

Inventor(s) Paul Anthony Lawrence, Robert William Aitken and Robert Neil Bennett It is certified that error appears in the above-identified patent and that said Letters Patent are hereby corrected as shown below:

Col. 1, line 28, for "give n" read --given--;

Col. 2, line 41, for "wt." read --wt.,--;

Col. 3, line 17, for "is" read --if--;

Col. 3, line 39, for "your" read --pour--;

Col. 4, Table 1, column headed "550", seventh line, for "4.45" read --5.45--;

Col. 4, Table 1, column headed "650", seventh line, for "6.19" read --6.18--;

Col. 5, line 27, for "m.1/g" read --ml/g--;

Col. 5, Table 4, last line, for "percent w" read --% wt.--;

Col. 6, Table 7, line reading "Liquid yield, percent wt", for "81.3" read --91.3--; and for "81.9" read --81.8--;

Col. 7, Table 10, right-hand column, first line, for "PT" read --Pt--;

Col. 7, Table 11, column headed "Nickel on hydrogen mordenite 220°C", eighth line, for "0.095" read --0.096--;

Col. 9, lines 1 and 2, for "methylene phthaline" read --methyl naphthalene--;

Col. 9, Table 12, fifth line from the bottom, for "C11" read --$C_{11}$--.

SIGNED AND
SEALED
OCT 27 1970

(SEAL)
Attest:

Edward M. Fletcher, Jr.
Attesting Officer

WILLIAM E. SCHUYLER, JR.
Commissioner of Patents